W. H. & G. W. MILLER.
Breech-Loading Fire-Arm.
No. 2,768. Reissued Oct. 1, 1867.
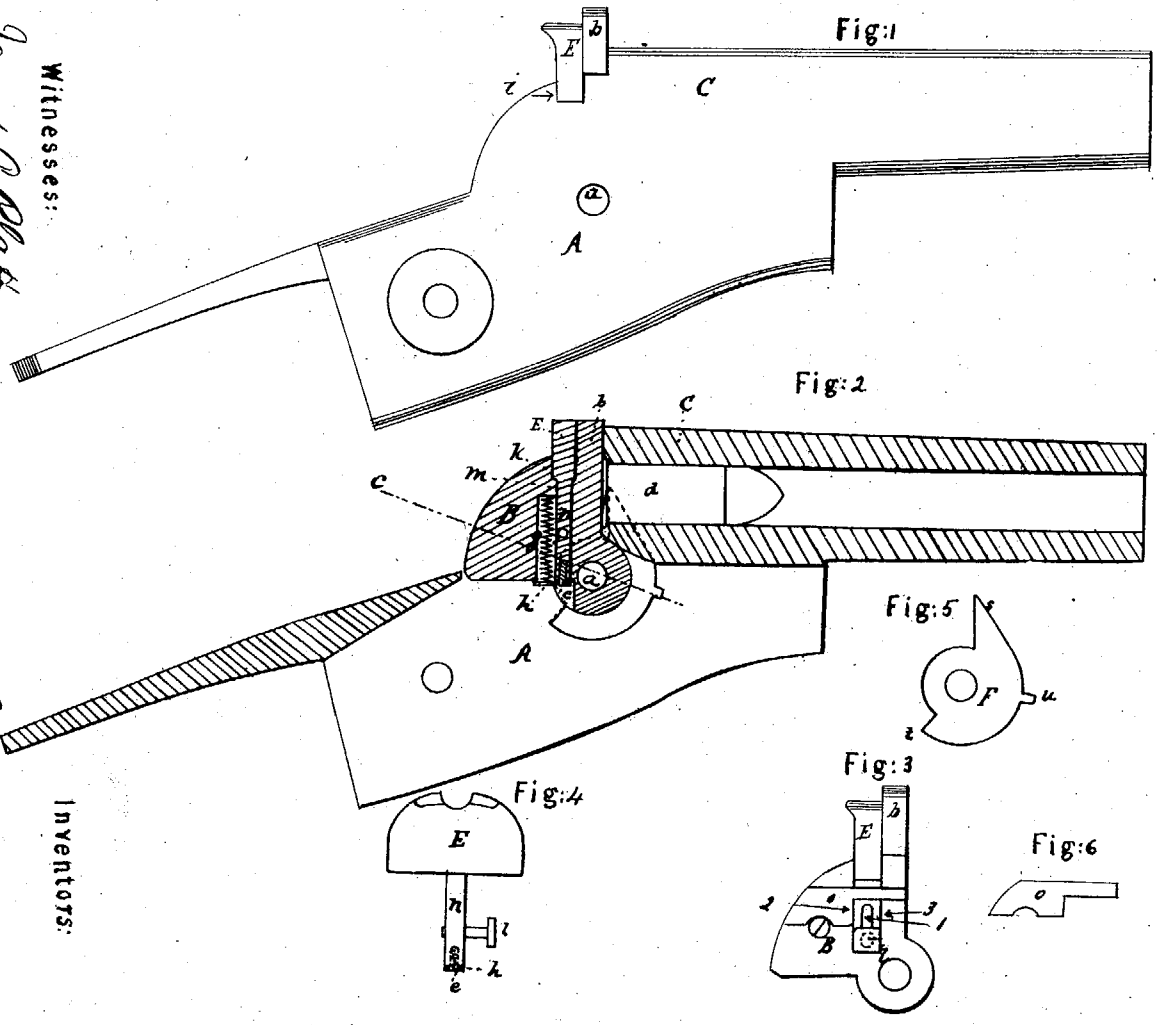
Witnesses:
James O Platt
Orville H Platt
Inventors:
Wm H Miller
Geo W Miller
N. PETERS, PHOTO-LITHOGRAPHER, WASHINGTON, D. C.

UNITED STATES PATENT OFFICE.

WILLIAM H. MILLER AND GEORGE W. MILLER, OF WEST MERIDEN, CONN.

IMPROVEMENT IN BREECH-LOADING FIRE-ARMS.

Specification forming part of Letters Patent No. 51,739, dated December 26, 1865; reissue No. 2,768, dated October 1, 1867.

*To all whom it may concern:*

Be it known that we, WILLIAM H. MILLER and GEORGE W. MILLER, of West Meriden, in the county of New Haven and State of Connecticut, have invented certain new and useful Improvements in Breech-Loading Fire-Arms; and we do hereby declare the following to be a full, clear, and exact description of the same, reference being had to the accompanying drawings, making a part of this specification, in which—

Figure 1 represents a side view of so much of a fire-arm as will illustrate our invention. Fig. 2 represents a vertical longitudinal section of or through the same. Figs. 3, 4, 5, and 6 represent detached portions of the arm, which will be more specifically referred to hereafter.

Similar letters of reference where they occur in the several separate figures denote like parts of the arm in all the drawings.

Our invention consists, first, in the combination of the latch, face-plate, swinging breech-piece, and catch, for the purpose of closing and locking the breech closed, and opening or operating the same.

Our invention further consists in combining with the latch a detent or locking mechanism, that locks the striker when the latch is raised, to prevent accidental explosion of the arm.

Our invention further consists in a shell-ejector hung on the pin upon which the swinging breech-piece moves, and which ejector has a motion with and independent of the breech-piece, as and for a purpose that will be explained.

To enable those skilled in the art to make and use our invention, we will proceed to describe the same with reference to the drawings.

A represents the case or frame of the arm which connects the stock and barrel, and in which is arranged the mechanism for operating the arm. B is a swinging breech-piece, which is hung and turns upon the pin *a* as a center of motion, so that when its face-plate or part *b* is up against the breech of the barrel C it will occupy a position about at right angles with the center line of the barrel; and when it is thrown back after discharging the arm, and preparing it for being reloaded, the face-plate will occupy the position nearly as shown by the line *c*, passing through the pivot-pin *a*. When the breech-piece is swung backward and downward it exposes to view the whole range of the bore of the barrel, and affords perfect facility for inserting, extracting, or expelling the cartridge *d*. On the rear side of, and in a parallel line with, the face-plate *b* is made a groove, *k*, for receiving the shoulders of the thumb-latch E, and from this groove *k* there extends an opening or hole, *m*, downward through the breech-piece B, into and through which the shank *n* of the thumb-latch passes. The shoulders of the thumb-latch extend through the groove *k*, and catch into depressions *i* in the frame or case of the arm in line with said groove when the breech-block is up close against the bore or end of the barrel, and the thumb-latch thus firmly locks the breech-piece against the end of the barrel. The stem or shank *n* of the thumb-latch, after passing down through the hole *m*, has a step or plate, *h*, secured to it by a screw, *e*, or a pin, said plate or step projecting far enough to receive and hold a coiled spring, *g*, which is placed in a recess in the breech-block. The tendency of this spring is to draw down the thumb-latch and hold it in the groove *k* and depressions *i*, and thus firmly hold the breech-piece locked up against the barrel. A sliding piece, *o*, is arranged in the side of the breech-piece B, for the purpose of receiving and transmitting the blow from the hammer to the fulminate of the cartridge; and a detent, *r*, the stem of which passes through a slot or mortise, 1, in the breech-piece, and into the stem *n* of the thumb-piece E, is so arranged as to prevent the possibility of accidental discharge of the cartridge, by means of the bar or piece *o*, except when it receives its impetus from the hammer, for when the thumb-latch E is lifted the detent *r* will rise with it, being connected to it between the shoulder 2 and the side of the depression 3, which effectually prevents the transmission of a blow, as the piece *o* is locked by the detent, and will remain so until the latch drops or is drawn into the depression or catch *i*, in which position it locks the breech-piece against the barrel, in which case an explosion would not be dangerous to the user of the gun, if even it were accidentally to take place. Besides, the end of the striker or exploding-piece *o* is small, and does not project from the surface of the breech-piece, and nothing but a suitably-shaped and sized striker, hammer, or nose could strike or move the piece *o* hard enough or far enough to reach the fulminate of the cartridge and explode it. F is a shell-discharger arranged upon the pin *a*, upon which the breech-piece B moves as a center. When the cartridge is inserted into its place in the breech end of the barrel, the front side of the finger *s* will be against the inside of the flange of the cartridge. After the explosion, and on opening or drawing back the face-plate *b* and breech-block, of which it is a part, the under side of the breech-piece B will strike the projection *t*, and cause the finger *s* of the extractor F to push or back out the shell from the barrel. The rearward motion of the finger *s* is limited by the action or means of the stop-pin *u*. The shell-discharger is hung loosely upon the pivot-pin *a* of the swinging breech-block, and when the breech-block is turned upon its pivot to open up the bore of the gun, it comes against the shoulder *t* of the ejector, and swings or turns said ejector with it on the pivot-pin. This motion throws the finger *s* against the flange of the empty shell or case, and throws it out of the gun. When the new cartridge is inserted in the bore of the gun, its flange, coming against the finger *s*, pushes it forward and downward, and turns the discharger upon the shaft *a*, it being loose thereon, until the cartridge is properly placed in the firing-chamber, and the succeeding opening up of the gun by turning the breech-piece upon its pivot again throws the finger against the flange of the shell, and again ejects or backs it out of the arm.

Having thus fully described the nature, object, and purpose of our invention, what we claim therein as new, and desire to secure by Letters Patent, is—

1. The latch E, arranged and operating in combination with the face-plate *b*, oscillating breech-piece B, and catch *i*, substantially as described.

2. We also claim the combination of the swinging breech-piece, striker, and detent, operating together as and for the purpose described.

3. We also claim the plate-ejector F, with its shoulder, stop, and finger, when hung loosely upon, and controlled in its movements solely by, the pivot-pin of the swinging breech, and moving around the same center with it, and operated by the inserting of the cartridge and the swinging of the breech, in the manner substantially as described.

WILLIAM H. MILLER.
GEORGE W. MILLER.

Witnesses:
RATCLIFFE HICKS,
ORVILLE H. PLATT.